United States Patent [19]

Nagao et al.

[11] Patent Number: 5,351,914
[45] Date of Patent: Oct. 4, 1994

[54] HYDRAULIC CONTROL SYSTEM FOR AIRCRAFT

[75] Inventors: Toru Nagao, Utsunomiya; Hiroyuki Kataoka, Soja, both of Japan

[73] Assignee: Fuji Jukogyo Kabushiki Kaisha, Tokyo, Japan

[21] Appl. No.: 894,554

[22] Filed: Jun. 5, 1992

[30] Foreign Application Priority Data

Jun. 14, 1991 [JP] Japan .................................. 3-143333

[51] Int. Cl.$^5$ ............................................. B64C 13/36
[52] U.S. Cl. ...................................... 244/78; 244/226; 244/194
[58] Field of Search ................ 244/78, 226, 227, 194, 244/195; 60/452

[56] References Cited

U.S. PATENT DOCUMENTS 4,667,472  5/1987  Clay et al. ............................. 244/78
4,967,557  11/1990  Izumi et al. ............................ 60/452

*Primary Examiner*—Michael S. Huppert
*Assistant Examiner*—Anne E. Bidwell
*Attorney, Agent, or Firm*—Beveridge, DeGrandi, Weilacher & Young

[57] ABSTRACT

A hydraulic control system for aircraft is disclosed, which has a flight maneuver system mounted on the aircraft and provided with a maneuver signal input and output system for controlling the aircraft depending on flight conditions. The system includes a differentiating circuit responsive to a first output signal for calculating an actuating speed of a servo actuator and for generating a speed signal Vc, a load calculating circuit responsive to the load signal for computing the load on the actuator and for producing a load signal, a pressure calculating circuit responsive to the speed and load signals for computing a pressure Ps to the actuator and for producing a pressure signal, and a setting circuit responsive to the pressure signal for deciding an optimum pressure of the hydraulic pump so as to precisely control the flight surface without energy loss. The pressure Ps is calculated by the following formula:

$$Ps = E \cdot (Vc/Vm)^2 \cdot Pm + F/A$$

where E: coefficient, Pm: maximum pressure of the pump, VM; maximum speed of the actuator, F: a load of the actuator, and A; actuating piston area of the actuator.

11 Claims, 6 Drawing Sheets

HYDRAULIC CONTROL SYSTEM FOR AIRCRAFT

BACKGROUND OF THE INVENTION

1. Field of the Invention

The present invention relates to a hydraulic control system for an aircraft. In particular the invention relates to a hydraulic control system for determining hydraulic fluid supply pressure of the hydraulic system from load and speed of a hydraulic servo-actuator so as to provide high energy efficiency.

2. Description of Related Art

Generally, a hydraulic system of an aircraft uses a constant hydraulic pressure controlling method.

A hydraulic pump and a pressure controlling method which are used in the hydraulic system for aircraft, can be categorized as the method using a combination of a constant-delivery capacity type pump with a relief valve, and another method using a variable-delivery capacity type pump for keeping the hydraulic pressure constant as described in "Kohkugaku Nyumon (Translated Title: Introduction to Aeronautics) Vol. 2 of 2", Kantosha, pp 104–109.

In addition, it has been proposed a controlling method of a load sensing hydraulic system for varying the hydraulic pressure in accordance with the load being applied.

As the hydraulic pressure controlling method, a load-sensing hydraulic system for controlling the delivery pressure and the flow rate of the pump in accordance with the load pressure is described in "Shiritai Yuatsu Jissaihen (Translated title: Hydraulic Pressure You Should Know, Practical Edition)", Japan Machinist Publishing Company, pp 101–108.

In addition, Japanese Patent Laid-Open Publication No. 60-146799 discloses a hydraulic control system for decreasing energy loss with respect to the hydraulic pressure loss thereof. In the system, the speed and the rotating direction of the hydraulic pump is controlled by an electric motor so that the hydraulic pressure and the flow rate are adjusted in accordance with the load being applied.

However, the related arts with respect to the constant hydraulic pressure control method and the load-sensing hydraulic system have the following drawbacks.

By the constant hydraulic pressure controlling method, the load to an actuator is not always constant. Rather, the load varies with the changes of the aircraft flying speed, attitude and altitude. On the other hand, by the constant hydraulic pressure control method, the setting pressure should be designated in accordance with the maximum value of the load being applied. Thus, when the magnitude of the external load is small, a large part of the supplied pressure becomes an excessive pressure. The excessive pressure results in heating of the hydraulic device, deterioration of fuel efficiency, reliability, and service life, and so forth as a power loss.

Moreover, in the load sensing hydraulic method, when the constitution of the hydraulic system matches the load being applied, a high energy saving effect can be obtained. However the system can be applied only to the hydraulic system in accordance with a meter-in circuit organization having a control valve disposed on the pressure inlet side of an actuator. In addition, when a pressure feedback pipe for transfering a load pressure to a flow-rate compensation mechanism is long, a response disadvantageously becomes low. Thus, when hydraulic systems used in the aircraft or a ship have a meter-out and meter-in circuit for controlling the actuator and the distance between the hydraulic pump and the actuator is very long, this technique is not useful.

Furthermore, according to the method for controlling the speed and the rotational direction of the hydraulic pump, the rotational direction and the speed should be controlled in accordance with the load conditions. Thus, this method cannot be used for the control system of the aircraft or the ship wherein the hydraulic pump is driven by a main engine which constantly rotates in one direction.

SUMMARY OF THE INVENTION

An object of the present invention is to solve above described problems and to provide a hydraulic control system for an aircraft with high energy efficiency which varies hydraulic pressure in accordance with a fluctuating load.

To accomplish the above object, there is provided the hydraulic control system for the aircraft having a flight maneuver system mounted on the aircraft and provided with a maneuver signal input system for controlling the aircraft in dependency on flying conditions and a maneuver signal output system for generating a first output signal, a flight control system responsive to the output signal for controlling a control surface and for producing a control signal, a hydraulic pump for supplying fluid to a servo actuator, and a detecting circuit for sensing a displacement and a load of the actuator and for producing a load signal, an improvement of the hydraulic control system comprising a differentiating circuit responsive to the first output signal for calculating an actuating speed of the servo actuator and for generating a speed signal, a load calculating circuit responsive to the load signal for computing a load on the actuator and for producing a load signal, a pressure calculating circuit responsive to the speed and load signals for computing a pressure to the actuator and for producing a pressure signal, and a setting circuit responsive to the pressure signal for determining an optimum pressure of the hydraulic pump so as to precisely control the flight surface without energy loss.

A pressure Ps is calculated by the following formula:

$$Ps = E \cdot (Vc/Vm)^2 \cdot Pm + F/A$$

where E is a coefficient, Pm is the maximum pressure of the pump, Vm is the maximum speed of the actuator, and A is an actuating piston area of the actuator.

Since a hydraulic pressure in accordance with a load applied to a control surface is supplied by means of a speed signal Vc and a load F of an actuator, a pressure control can be precisely accomplished in accordance with variations of conditions. Thus, according to the present invention, energy which is wasted in the related prior art can be saved. In addition, as well as reduction of fuel costs the pressure, hydraulic fluid, and device temperature can be decreased. Thus, a span of life (durability) and a reliability of the system are improved. Moreover, a cooler can be removed or capacity can be reduced. Thus, weight and space of the system can be reduced.

The other objects, features and advantages of the present invention will be understand in light of the following detailed description with reference to the accompanying drawings.

DESCRIPTION OF THE PREFERRED EMBODIMENT

Figure 1:
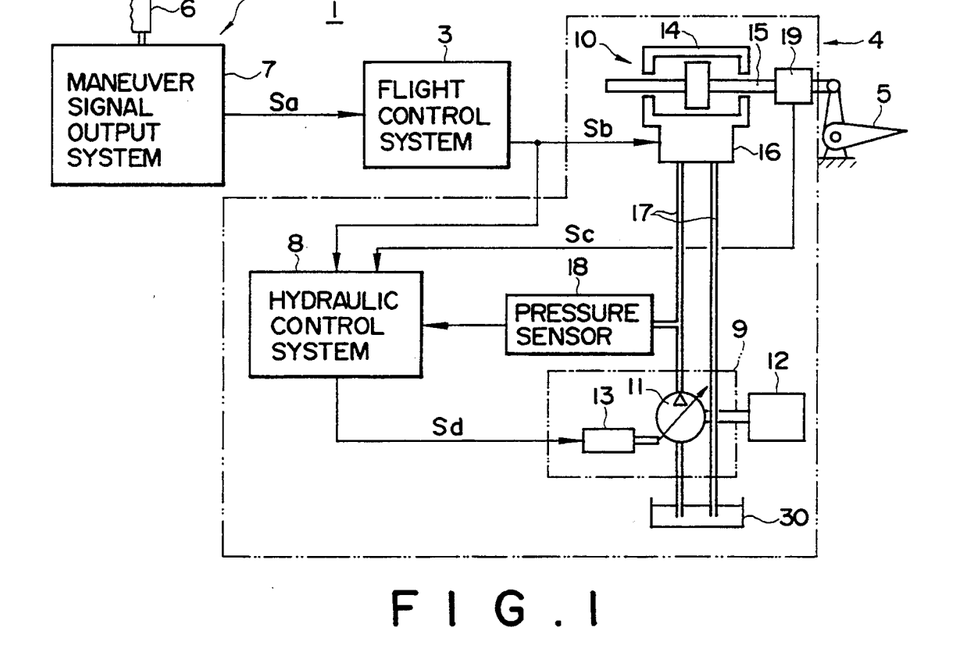
FIG. 1 is a combination of a schematic and block diagram showing a hydraulic control system for an aircraft according to the present invention.

FIG. 1 shows an entire maneuver system for an aircraft having a hydraulic control system according to the present invention. The maneuver system for the aircraft which is designated by reference numeral 1 comprises a flight maneuver system 2, a flight control system 3, the hydraulic control system 4, and a control surface 5. The flight maneuver system 2 comprises a maneuver signal input system 6 with which a pilot maneuvers the aircraft in accordance with flying conditions and a maneuver signal output system 7 for generating a maneuver signal in accordance with the maneuver amount of the maneuver signal input system 6. The hydraulic control system 4 comprises a hydraulic control device 8, a hydraulic pump unit 9, and an actuator 10. The hydraulic pump unit 9 has a main pump unit 11 and an actuator 13. The hydraulic pump 9 is driven by an engine or a motor 12 of the aircraft. The actuator 10 comprises a hydraulic cylinder 14, an output rod 15 constituting a piston, and a selector valve 16 for switching the supply of hydraulic fluid to the hydraulic cylinder 14. The hydraulic pump 9 and the actuator 10 are connected through a hydraulic circuit 17. The hydraulic circuit 17 supplies hydraulic fluid from a reservoir 30 to the actuator 10 through the hydraulic pump 9 and then returns the hydraulic fluid back to the reservoir 30. The hydraulic circuit 17 on the discharge side of the hydraulic pump 9 is provided with a pressure sensor 18. As shown in the FIG. 1, the output rod 15 of the actuator 10 is rotatably connected to a part of the control surface 5 so that the axial movement of the output rod 15 actuates the control surface 5 in swinging movement. Thus, the angle of incidence or attack of the control surface 5 can be varied against the air flow. The output rod 15 is provided with an output sensor 19 for detecting the displacements of the output rod 15 and the control surface 5.

When the pilot operates the input system 6, the output system 7 generates a maneuver signal Sa in accordance with the operation of the input system 6 and sends the signal to the flight control system 3. As well as generating another maneuver signal, the flight control system 3 generates a maneuver signal Sb for controlling the displacement of the control surface 5 and sends this signal to both the hydraulic control device 8 and the actuator 10. The hydraulic control device 8 receives the maneuver signal Sb and an output signal Sc sent from the output sensor 19. The hydraulic control device 8 generates a pump discharge pressure command signal Sd in accordance with the maneuver signal Sb and the output signal Sc and sends the signal Sd to the actuator 13. The actuator 13 controls the discharge pressure of the hydraulic pump 9 in accordance with the pump discharge pressure command signal Sd and sends the commanded hydraulic pressure to the actuator 10.

Figure 2:
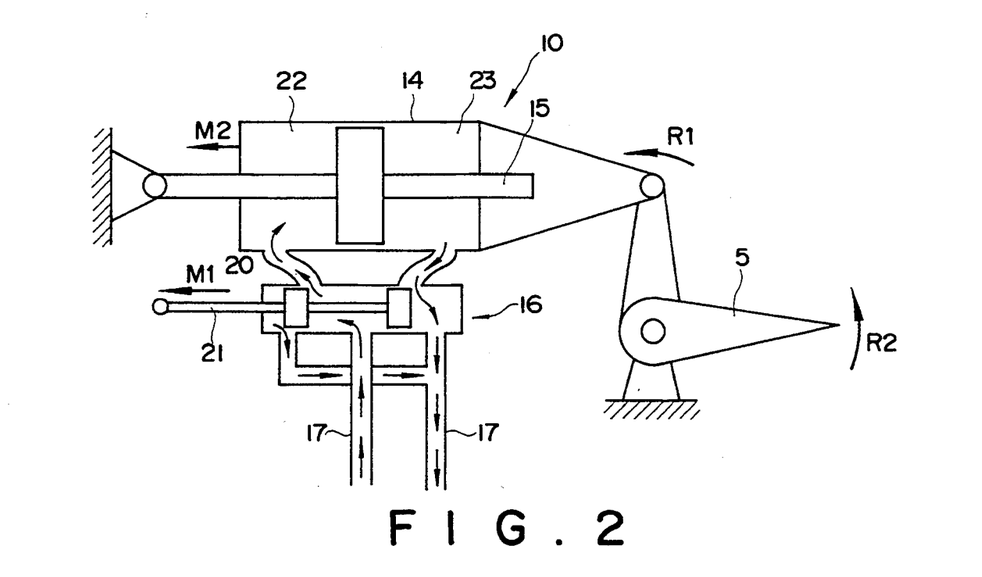
FIG. 2 is a schematic diagram showing an actuator of a hydraulic control system.

FIG. 2 shows an operation of the actuator 10. The output rod 15 of the actuator 10 shown in FIG. 2 is pivotably connected at one end thereof to a fixed member. The hydraulic cylinder 14 is pivotally connected at an end thereof remote from the fixed member to a part of the control surface 5. The control surface 5 is pivotably connected at a leading edge portion thereof to a fixed member. The selector valve 16 comprises a selector cylinder 20 and a spool 21. The spool 21 has two valve members which slide in the selector cylinder 20. The wall member of the selector cylinder 20 has five holes. When the spool 21 is placed in a neutral position, two holes connected to the hydraulic cylinder 14 are blocked with the two valve members of the spool 21 so as to stop supplying hydraulic fluid to the hydraulic cylinder 14.

When the spool 21 is moved in the direction M1 shown in the FIG. 2, the hydraulic fluid flows to a cylinder chamber 22 through the selector valve 16 as shown by the arrow marks. In addition, the hydraulic fluid which is present in the cylinder chamber 23 flows to the hydraulic circuit 17 through the selector valve 16. Consequently, the hydraulic cylinder 14 moves in the direction M2. Thus, the hydraulic cylinder 14 and the control surface 5 rotatably connected thereto move in the direction R1. Thus, the trailing edge portion of the control surface 5 pivots in a direction R2. When the spool 21 is moved in the direction reverse to M1, the hydraulic fluid reversely flows. Thus, the control surface 5 moves in the reverse direction.

With the maneuver signal Sb and the output signal Sc, the pump discharge pressure command signal is generated in the following manner.

The relations among the thrust, speed, and pressure of the actuator using hydraulic fluid satisfy the following formula.

$$A \cdot X'a = Kv \cdot Xv \sqrt{Ps - F/A} \quad (1)$$

where:

A is the area of the piston;

Xa is the displacement of the actuator;

X'a is the output speed of the actuator, which is obtained by differentiating Xa;

Xv is the opening degree of the valve;

Kv is the constant;

Ps is the supplying pressure which is the difference between high pressure P1 and low pressure P2 of the actuator; and F is the load (thrust).

By rearranging the formula (1), the following formula can be obtained.

$$Ps = \{(A \cdot X'a)/(Kv \cdot Xv)\}^2 + F/A \quad (2)$$

Under the conditions where the opening degree of the valve is maximum (Xv=Xv max), the supplying pressure is maximum (Ps=Ps max), and the thrust is absent (F=0), then the actuator produces the maximum speed (X'a=X'a max). When these values are substituted into the formula (1), the following formula can be obtained.

$$Kv = \frac{AX'a \max}{Xv \max \sqrt{Ps \max}} \quad (3)$$

When the formula (3) is substituted into the formula (2) and then rearranged, the following formula can be obtained.

$$Ps = (X'a/X'a \max)^2 \cdot (Xv \max/Xv)^2 \cdot Ps \max + F/A \quad (4)$$

The formula (4) is a basic formula for obtaining the pressure Ps necessary for the hydraulic system having the actuator.

In the formula (4), (Xv max/Xv) is a parameter which is controlled by the maneuver system rather than the hydraulic system. Thus, (Xv max/Xv) is constant. In other words, $(Xv \max/Xv)^2 = E$ (where E is constant).

When the relation of (Xv=Xv max) is satisfied, E becomes 1. When the valve is closed, since Xv→0, E→∞. Thus, the value of the constant E varies depending on the opening degree of the valve. Normally, in consideration of the response property of the maneuver system, the hydraulic pressure can be controlled with E=1. However, in accordance with the property of the system to which the present invention is applied, the value of the constant E can be changed.

With the speed signal Vc of the actuator rather than the output speed X'a thereof, a desired operating speed of the actuator can be obtained.

Thus, the formula (4) can be arranged as follows.

$$Ps = E \cdot (Vc/Vm)^2 \cdot Ps \max + F/A \quad (5)$$

where Vm (=X'a max) is the maximum output speed of the actuator.

The formula (5) has two variables which are Vc (the speed signal of the actuator) and F (the load of the actuator). With these two variables, the pressure necessary for the hydraulic system at the time can be obtained.

Figure 3:
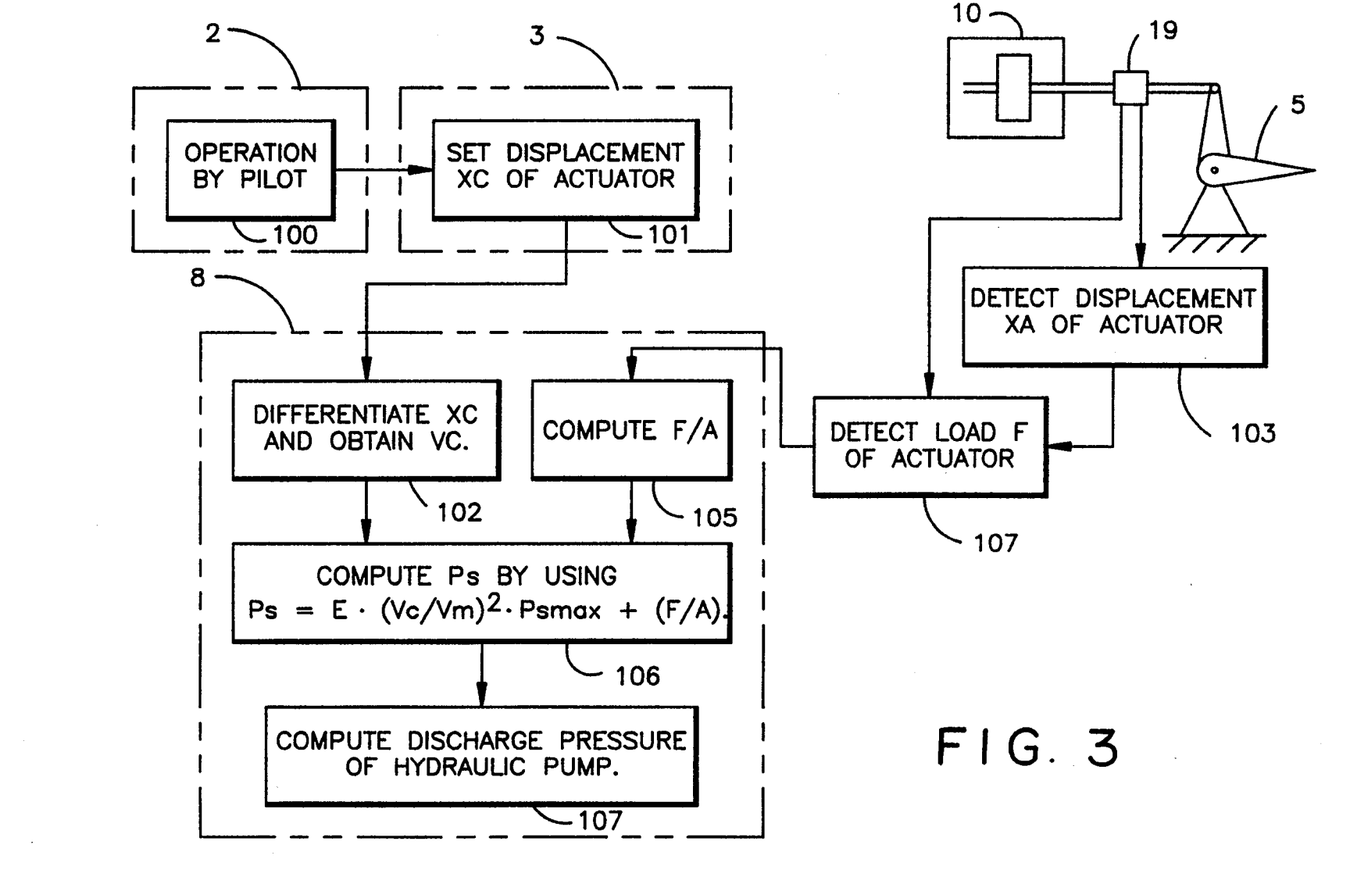
FIG. 3 is a flow chart indicating a process for computing a supplying pressure of hydraulic fluid of a hydraulic system.

With the formula (5), the required hydraulic pressure can be obtained. FIG. 3 shows a flow chart of basic computations.

The pilot operates the flight maneuver system 2 (in the step 100). The flight control system sets the displacement Xc of the actuator (in the step 101). The hydraulic control device 8 differentiates the displacement Xc (in the step 102). On the other hand, the output sensor 19 detects the displacement Xa of the actuator (in the step 103). The load F is detected in accordance with the displacement Xa of the actuator or directly (in the step 104). The hydraulic control device 8 computes F/A (in the step 105). With Vc computed in the step 102 and F/A computed in the step 105, the pressure Ps supplied to the actuator is computed (in the step 106). Thereafter, in accordance with Ps, the discharge pressure of the hydraulic pump is computed (in the step 107).

When the above described method is applied to a real hydraulic system, although the following problems take place, they can be solved by the following methods.

Since the supplying pressure of hydraulic fluid computed with the formula (5) is affected by the maneuver speed which varies frequently, the discharge pressure of the pump increases and decreases in a short cycle. Thus, the pressure in the hydraulic system varies in a short cycle, thereby causing fatigue in the hydraulic device and pipes. In addition, since the discharge pressure is changed, the parts of the hydraulic pump 9 are subjected to wear and fatigue. Thus, the service life of the hydraulic pump 9 is shortened.

According to the present invention, to solve such problems, two control methods, namely, "stepwise pressure control" and "pressure peak holding control", are used.

Figure 4A:
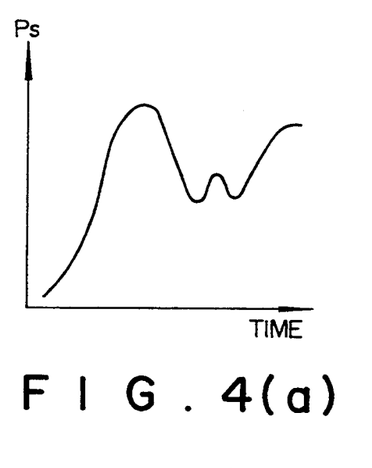
FIGS. 4a–4b are graphs indicating the pressure of the hydraulic fluid of a hydraulic system by a "stepwise pressure control"
Figure 4B:
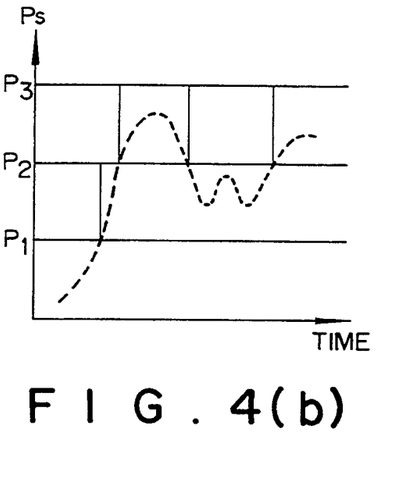

FIG. 4(a) shows computed values of the pressure Ps supplied to the hydraulic servo actuator varying with time. FIG. 4(b) shows values of the pressure Ps converted by the stepwise pressure control method varying with time.

As shown in FIG. 4(b), in the "stepwise pressure control" method, the pressure range is divided into several phases (the figure shows three phases which are P1, P2, and P3). Ps is stepwisely varied as shown by the solid line so as to absorb the pressure variation which takes place in each phase.

On the other hand, in the "pressure peak holding control" method, to decrease the frequency of the pressure variation, the raised pressure is held for a predetermined period of time.

Figure 5A:
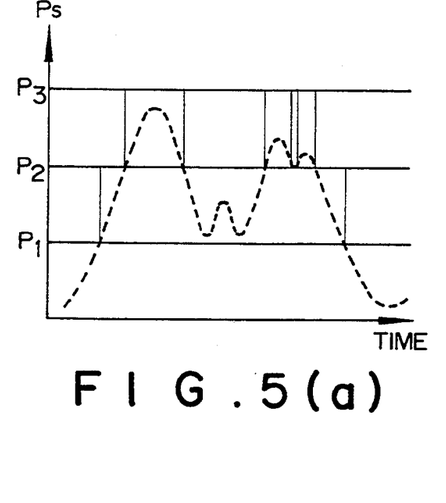
FIGS. 5a–5b are graphs indicating a "pressure peak holding control" method.
Figure 5B:
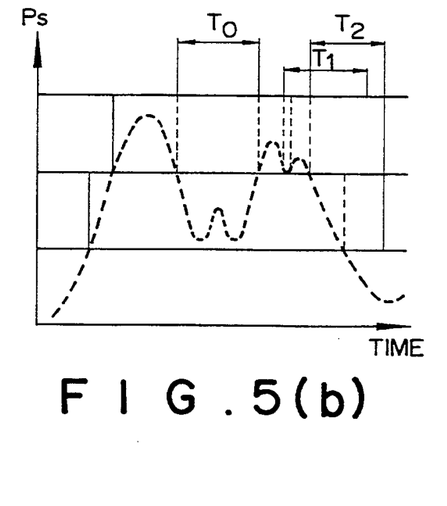

FIG. 5(a) shows the variation with time of Ps which is controlled by the above mentioned "stepwise pressure control" method. In the "stepwise pressure control" method, when the computed Ps varies nearly at the boundary of the pressure range, the controlled Ps fluctuates rapidly in a short time between P2 and P3 as shown by the solid line of the figure. In contrast, FIG. 5(b) shows the variation with time of Ps which is controlled by the "pressure peak holding control" method. In the "pressure peak holding control" method, the peak value of Ps is held for a predetermined period of time.

As shown in FIG. 5(b), the pressure Ps which is computed is raised without a delay. When the pressure Ps which is computed is lowered, delays T0, T1, and T3 (holding periods of time) are introduced. Thus, as shown by the solid line of FIG. 5(b), the pressure variation decreases. Consequently, when an emergency operation for an aircraft or the like is performed to prevent a dangerous situation, the pressure is immediately raised and a high speed response is obtained so as to maintain safety. In addition, the pressure is lowered with delays to prevent the hydraulic system from being adversely affected.

The hydraulic system for an aircraft or the like supplies hydraulic pressure to a plurality of actuators for a landing device, flaps, elevators, ailerons, rudders, and so forth. Each actuator has a unique optimum pressure. Thus, it is necessary to select a different hydraulic pressure for each control object.

To solve this problem, hydraulic pressure is controlled by "object selecting logic".

In the method of control of the hydraulic pressure using the "object selecting logic", the objective hydraulic devices are categorized into two groups. One group is a computational hydraulic device group where hydraulic pressure is determined by computations, and the other is an ON-OFF hydraulic device group wherein hydraulic pressure is uniformly determined. The computational hydraulic pressure device group includes a control surface actuator which is to be always controlled. The ON-OFF hydraulic device group includes a landing device, brakes, flaps, and so forth which are intermittently controlled.

The hydraulic pressure of the computational hydraulic device group is obtained by computations. Thereafter, a proper value in accordance with the above described control method is selected. In addition, the hydraulic pressure of the ON-OFF hydraulic device group is fixed at the maximum hydraulic pressure (Ps max).

Figure 6:
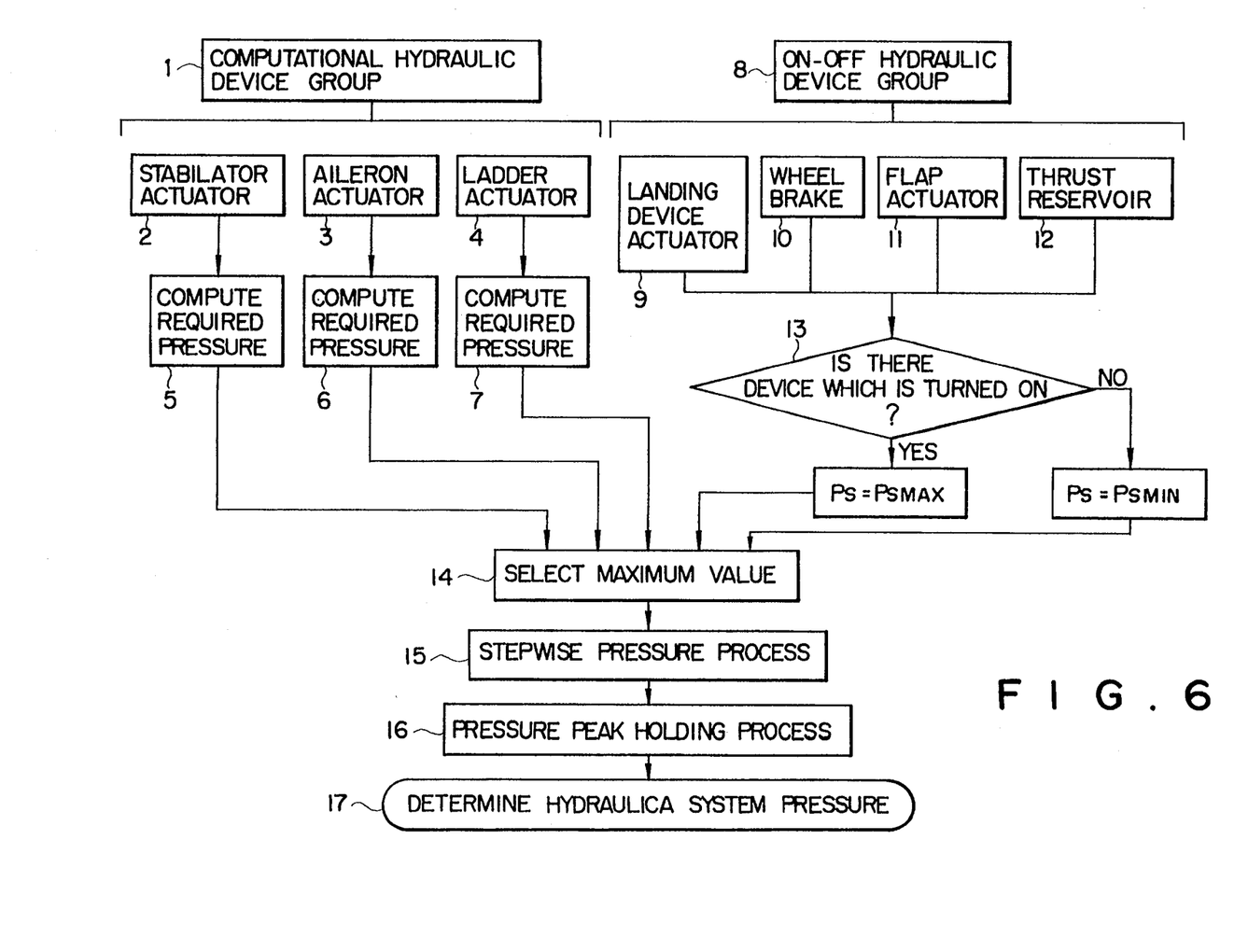
FIG. 6 is a flow chart showing a selecting logic.

FIG. 6 shows a flow chart of the object selecting logic. The hydraulic pressure of the computational hydraulic device group is obtained by computations. The hydraulic pressure (Ps max or Ps min) of the ON-OFF hydraulic device group is selected depending on whether or not each hydraulic device is in the operating state. With the hydraulic pressure of the computational hydraulic device group and that of the ON-OFF hydraulic device group, the maximum value thereof is selected. The selected hydraulic pressure is processed by the stepwise pressure process and the pressure peak holding process. Finally, the hydraulic pressure of the entire hydraulic system is determined.

The value of the load F of the actuator 10 is computed in the following manner.

In the formula (5), important parameters for determining the hydraulic pressure are F (the load of the actuator) and Vc (the speed signal of the actuator). To accurately measure F, such a load measuring device as a load cell should be mounted on the actuator of the control surface or a fixture thereof. However, when the load cell is mounted, its weight and volume disadvantageously affect the system. However, instead of using the load cell or the like, a load estimation method for indirectly estimating F can be used.

An approximate value of the external load F applied to the actuator can be given by the following formula.

$$F = \rho \cdot V^2 \cdot G \cdot S \cdot C(C_h\alpha \cdot \alpha + C_h\delta \cdot \delta + C_{ho})/2 \qquad (6)$$

where
F is the load of the actuator;
$\rho$ is the air density;
V is the flying velocity or speed;
G is a constant;
S is the area of the control surface;
C is the chord length of the control surface;
$C_h\alpha$ is the differential coefficient of the hinge moment (a component of angle of incidence or attack);
$C_h\delta$ is the differential coefficient of the hinge moment (a component of angle of helm);
$C_{ho}$ is the differential coefficient of the hinge moment;
$\alpha$ is the angle of incidence or attack; and
$\delta$ is the angle of helm.

Figure 7:
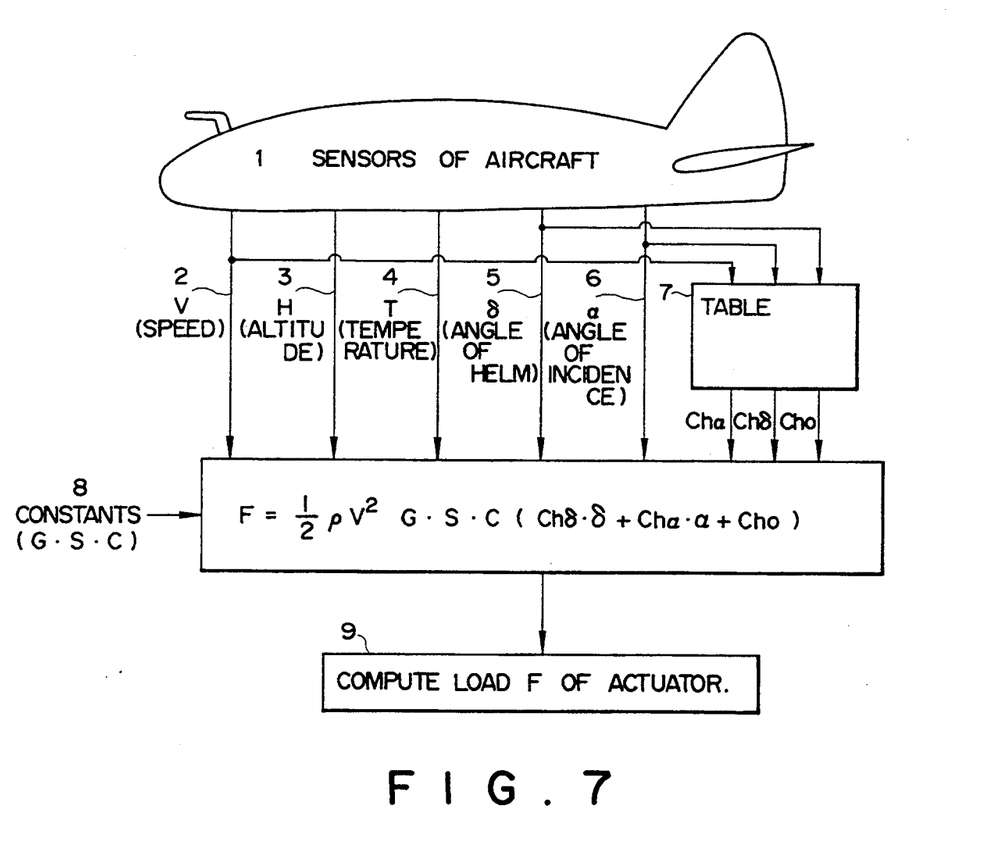
FIG. 7 is a schematic block diagram indicating a method for computing an actuator load from the flying speed and other quantities detected by sensors.

FIG. 7 is brocle diagram of computation for obtaining the load F of the actuator by using the formula (6). Since the three variables, which are the flying speed (V), the angle of incidence ($\alpha$), and the angle of helm ($\delta$), in the formula (6) are monitored by sensors mounted on the aircraft, they can be determined without providing special devices.

In addition, the air density ($\rho$) can also be determined from the altitude and temperature. Although the hinge moment differential coefficients ($C_h\alpha$, $C_h\delta$, and $C_{ho}$) are not constant but vary in accordance with the flying speed, $\alpha$, and $\delta$, they are stored in a computer as a table. Moreover, G, S, and C are constants.

By using the monitored values, table values, and constants, the load F necessary for the actuator can be obtained in accordance with the formula (6).

Furthermore, by using all or part of the speed (V), angle of helm ($\delta$) and angle of incidence ($\alpha$), the load F can be roughly estimated without computations in accordance with the formula (6). Thus, the computation time can be shortened.

When the fully floating type stabilator which is used in many aircraft is considered, the formula (6) can be expressed by the following formula (7).

$$F = \tfrac{1}{2}\rho \cdot V^2 \cdot G \cdot S \cdot C \cdot C_h\alpha(\alpha+\delta) \qquad (7)$$

When the control surface is provided with fixed portions as in the case of an aileron, rudder, and so forth, the formula (6) can be expressed by the following formula (8).

$$F = \tfrac{1}{2}\rho \cdot V^2 \cdot G \cdot S \cdot C \cdot C_h\delta \cdot \delta \qquad (8)$$

Figure 8:
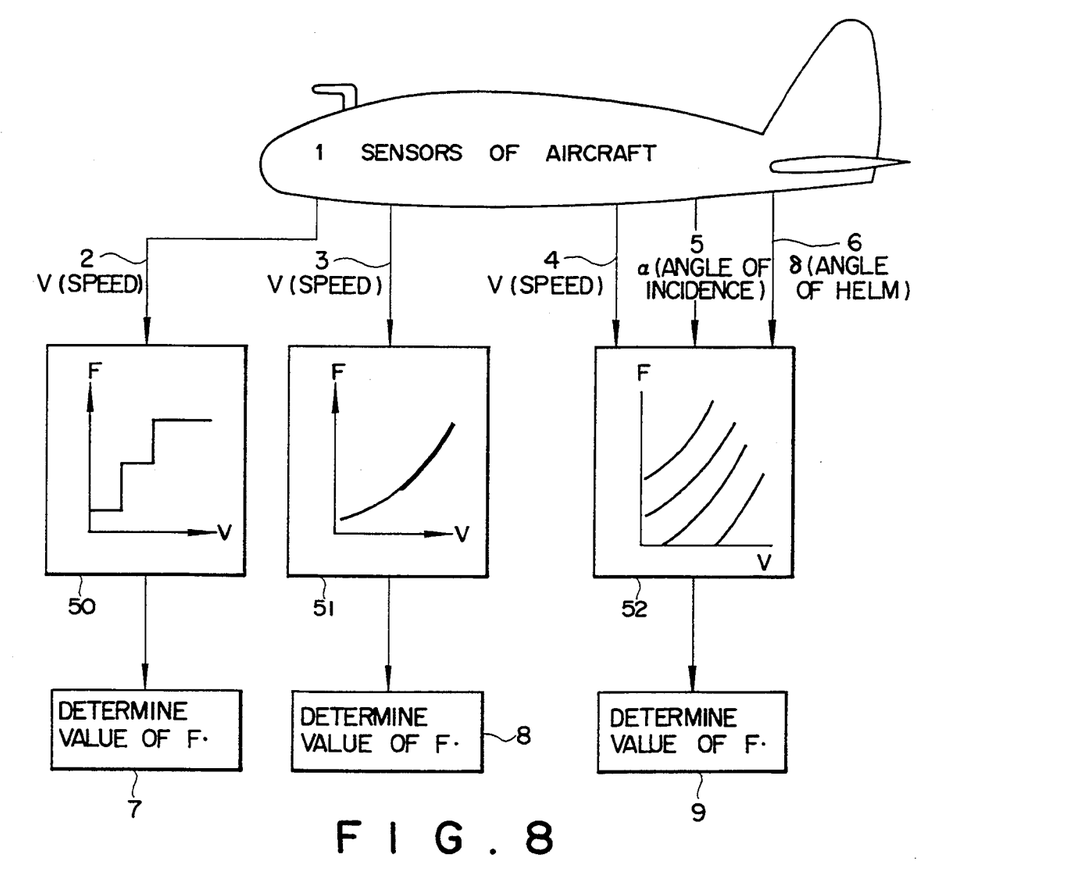
FIG. 8 is a schematic block diagram indicating a simple method for computing the actuator load from the flying speed and other quantities.

In the formulas (7) and (8), since the value of $\alpha$ or $\beta$ has been already determined, by setting the load with respect to the flying speed, the load F of the actuator can be simply obtained. FIG. 8 indicates the simple load estimation method.

As shown in FIG. 8, there are three methods for simply obtaining the load F of the actuator. The reference numeral 50 in the figure represents the first estimating method for detecting the flying speed V by a sensor of the aircraft and estimating the value of F by using the flying speed V and the nonlinear chart of F which corresponds to the flying speed V. The reference numeral 51 represents the second estimating method for estimating the value of F by using the flying speed V and the chart of F which continuously varies in accordance with the flying speed V. The reference numeral 52 represents the third estimating method for estimating the value of F by using the flying speed V, angle of incidence $\alpha$, and angle of helm $\delta$.

What is claimed is:

1. A hydraulic control system for an aircraft, said aircraft having a control surface, hydraulic pump, a servo actuator for operating said control surface in association with fluid supplied from said hydraulic pump, a flight maneuver system for generating an output signal to control said aircraft depending on flight conditions and a flight control system responsive to said output signal for producing to said servo actuator a control signal representing the displacement of said servo actuator, the hydraulic control system comprising:

differentiating means responsive to said control signal for calculating an actuating speed of said servo actuator and for generating a speed signal;

load detecting means for detecting the load on said servo actuator and for producing a load signal;

pressure calculating means responsive to said speed and load signals for computing an optimum pressure of fluid to be supplied to said servo actuator and for producing a pressure signal; and setting means responsive to said pressure signal for controlling said hydraulic pump so as to supply fluid to said servo actuator at said optimum pressure, thereby to precisely control said control surface with minimum energy loss.

2. The system according to claim 1, wherein said optimum pressure Ps is calculated by the following formula as a function of said servo actuator actuating speed Vc and said load F:

$$Ps = E \cdot (Vc/Vm)^2 \cdot Pm + F/A$$

where E is a coefficient, Pm is the maximum delivery pressure of said pump, Vm is the maximum speed of said actuator, and A is the actuating piston area of said actuator.

3. The system according to claim 1, wherein said optimum pressure is stepwisely output in accordance with a plurality of predetermined ranges.

4. The system according to claim 1, wherein said optimum pressure is held for a predetermined period of time when decreasing.

5. The system according to claim 1, further comprising:
   a continuously actuating servo device being including in said actuator of in said hydraulic control system; and
   an intermittently actuating servo devices controlled by a maximum pressure of said pump.

6. The system according to claim 1, wherein said detecting means calculates to convert said load signal from the output of various sensors.

7. The system according to claim 1 further comprising:
   selecting means for selecting a maximum pressure of fluid to be supplied from said pump whenever said aircraft is equipped with a continuously actuating servo device being operated at a computed unique optimum pressure, and an intermittently actuating servo device, and said intermittently actuating servo device operates in addition to the operation of said continuously actuating servo device.

8. An aircraft having a hydraulic control system for providing a control signal to a hydraulic pump which efficiently manipulates a servo actuator which is connected to a control surface, said hydraulic control system comprising:
   differentiating means which, in response to a maneuver control signal, calculates an actuation speed of said servo actuator and generates a corresponding speed signal;
   load detecting means which detects a load on said servo actuator and generates a corresponding load signal;
   pressure calculating means which, based on said speed and said load signals, calculates an optimum pressure of a fluid to be supplied to said servo actuator and generates a corresponding pressure signal; and
   setting means which, in response to said pressure signal, outputs said control signal to said hydraulic pump which in turn provides fluid to said servo actuator at said optimum pressure thereby precisely manipulating said control surface with a minimum associated energy loss.

9. The aircraft according to claim 8, wherein said optimum pressure Ps is calculated by, $$Ps = E \times (Vc/Vm)^2 \times Pm + F/A$$

where:
   E is a coefficient,
   Vc is a servo actuating speed,
   Vm is the maximum speed of said actuator,
   Pm is the maximum delivery pressure of said pump,
   F is a load on the actuator, and
   A is the actuating area of said actuator.

10. A method of controlling a hydraulic system in an aircraft to provide a control signal to a hydraulic pump which efficiently manipulates a servo actuator which is connected to a control surface, said method comprising the steps of:
   calculating an actuation speed of said servo actuator based on a maneuver control signal and generating a corresponding speed signal;
   detecting a load on said servo actuator and generating a corresponding load signal;
   calculating an optimum pressure of a fluid to be supplied to said servo actuator based on said speed and said load signals, and generating a corresponding pressure signal; and
   providing said control signal to said hydraulic pump based on said pressure signal, said pump in turn providing fluid to said servo actuator at said optimum pressure thereby precisely manipulating said control surface with a minimum associated energy loss.

11. The method according to claim 10, wherein said optimum pressure Ps is calculated by, $$Ps = E \times (Vc/Vm)^2 \times Pm + F/A$$

where:
   E is a coefficient,
   Vc is a servo actuating speed,
   Vm is the maximum speed of said actuator,
   Pm is the maximum delivery pressure of said pump,
   F is a load on the actuator, and
   A is the actuating area of said actuator.

* * * * *